United States Patent [19]

Levasseur et al.

[11] Patent Number: 4,761,714
[45] Date of Patent: Aug. 2, 1988

[54] ANODE AND CAPACITOR AND METHOD THEREFOR

[75] Inventors: Jean Levasseur, Chambray Les Tours; Didier Gouvernelle, Semblancay, both of France

[73] Assignee: Sprague Electric Company, North Adams, Mass.

[21] Appl. No.: 58,473

[22] Filed: Jun. 5, 1987

[30] Foreign Application Priority Data

Aug. 5, 1986 [FR] France ................... 86 11316

[51] Int. Cl.⁴ .................. H01G 9/05; H01L 23/28
[52] U.S. Cl. ........................ 361/433; 29/570.1
[58] Field of Search ............... 29/569.1, 570; 361/306, 361/307, 433, 433 T

[56] References Cited

U.S. PATENT DOCUMENTS

| | | | |
|---|---|---|---|
| 2,020,408 | 11/1935 | Fruth | 361/433 T |
| 2,444,914 | 7/1948 | Brennan | 361/433 |
| 2,869,052 | 1/1959 | Ness et al. | 361/433 T |
| 4,247,883 | 1/1981 | Thompson et al. | 361/306 X |
| 4,288,842 | 9/1981 | Voyles | 361/433 |
| 4,660,127 | 4/1987 | Gunter | 361/433 |
| 4,675,790 | 6/1987 | DeMatos et al. | 361/433 |

FOREIGN PATENT DOCUMENTS

| | | | |
|---|---|---|---|
| 1038193 | 9/1958 | Fed. Rep. of Germany . | |
| 215420 | 11/1984 | German Democratic Rep. | 361/433 |
| 2002586 | 2/1979 | United Kingdom . | |

Primary Examiner—Donald A. Griffin

[57] ABSTRACT

A porous tantalum anode body is sintered onto a strip having an incurvate member which is embedded in the body and an elongated portion of the strip which serves as the anode connection.

10 Claims, 2 Drawing Sheets

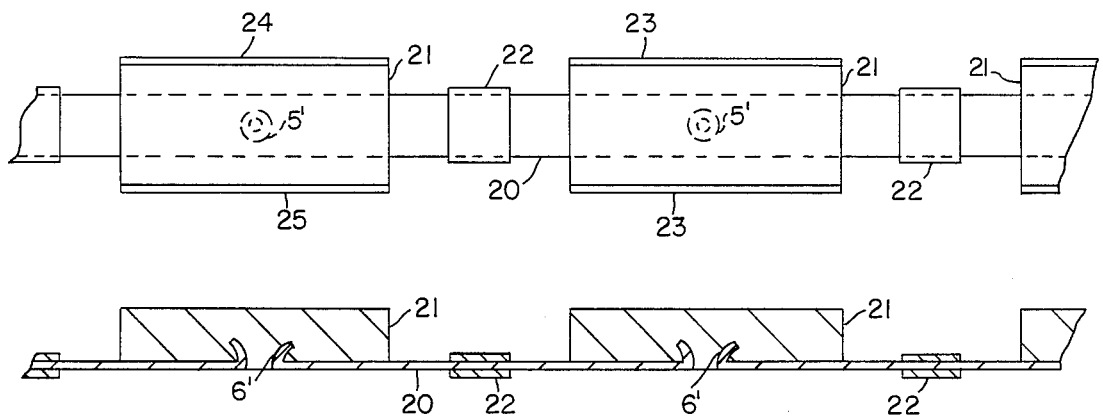
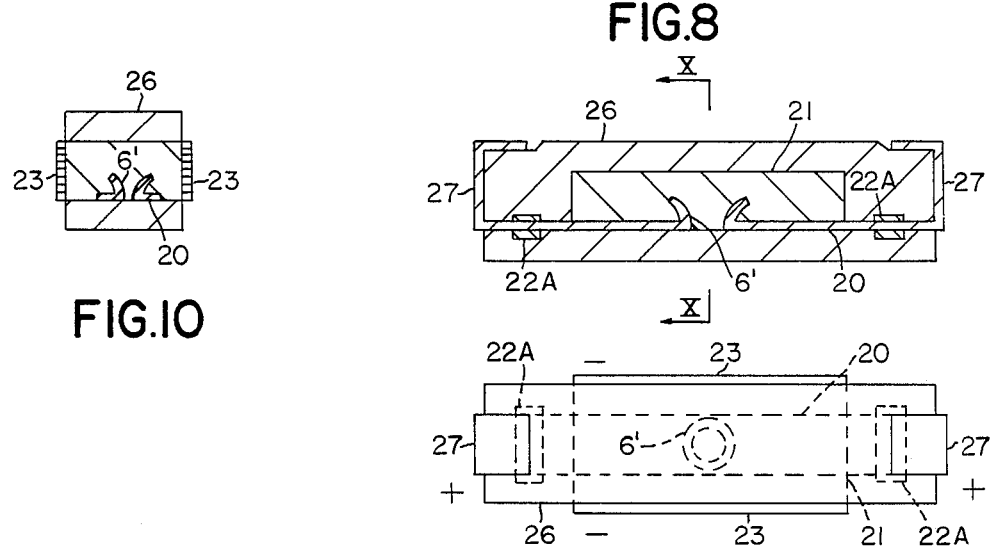

ANODE AND CAPACITOR AND METHOD THEREFOR

BACKGROUND OF THE INVENTION

The invention concerns anodes and capacitors, and in particular tantalum anodes and capacitors, preferably of the "chip" type (i.e. for surface mounting), and methods for their production.

Such a capacitor is well known in the prior art and is described in copending U.S. patent application Ser. No. 933,404 filed Nov. 21, 1986. That capacitor comprises an anode formed by a porous body fitted with a connection wire itself connected to a positive terminal of the capacitor. Connection of the wire to the porous body necessitates a fairly complex process comprising in practice powder pressing to form a pellet, a stage during which the elongated connection wire is welded to the pellet after initial sintering, then a second sintering stage. Each of the wires then has to be welded to a support element, the purpose of which is to enable several anodes to be processed simultaneously so as to ensure series production of the capacitors.

SUMMARY OF THE INVENTION

An objective of this invention is to simplify the prior art procedure of connection of an elongated element to a porous body in order to arrive at high efficiency series production. Another objective is to ensure high mechanical strength of the link between the elongated element and the porous body. Equally, this invention concerns a symmetrical capacitor, reducing the present risk of making reverse connections.

In accordance with this invention, an anode for a capacitor, notably in tantalum, comprising a porous body, in practice in the form of a parallelepiped, a prism or a cylinder, is connected to an elongated element characterized in that said elongated element is a strip presenting an incurvated zone anchored to said body. Preferably, this strip runs at least partly along the outer surface of the porous body. The connection thus obtained has very good mechanical strength. Preferably, these incurvated zones consist of eyelet-like pieces obtained by piercing the strip.

This invention proposes a method of manufacture of anodes for capacitors, notably in tantalum, whereby a porous body is pressed and sintered and added to an elongated connection element, characterized in that a strip is locally incurvated towards the exterior of its plane and this porous body is pressed and sintered onto this strip (preferably along this strip) so as to retain captured within this body that part of this strip thus incurvated.

Owing to the presence of the incurvated zones, the powder of the body can be pressed onto the strip itself, and simultaneously connected to it. Furthermore, use of the strip enables these strip sections to be secured to a support element; it suffices to cut these sections and this element from the same strip (for example cutting out to "combs" arranged head-on so that their teeth interleave). As a preferential variant, these different sections are successive sections of a single strip that is cut out during the final manufacturing stages of a capacitor: this enables the strip to be used almost entirely, which is of advantage in the case of expensive materials such as tantalum.

The invention also proposes a tantalum capacitor comprising a porous body encapsulated into a block of resin and connected to an elongated element forming a positive terminal, and a negative terminal, characterized in that said elongated element is a strip (preferably at least partially running along an outer face of said porous body), presenting an incurvated zone anchored into said body. Preferably, said elongation element extends to two terminal faces of the block of resin and two negative connection zones are formed on two opposed side faces of said body that are not encapsulated into the block of resin. In this way, a symmetric polarized capacitor is obtained the assembly of which can take place under highly reliable conditions.

BRIEF DESCRIPTION OF THE DRAWINGS

Objectives, characteristics and advantages of the invention emerge from the following description, which is given as non-limitatory example giving reference to drawings in which:

FIG. 6 is a top view of a series of anodes according to a second embodiment of this invention;

FIG. 7 is a longitudinal section of FIG. 6;

FIG. 8 is a longitudinal sectional view of a completed capacitor comprising an anode of FIGS. 6 and 7;

FIG. 9 is a bottom view of the capacitor of FIG. 8; and

FIG. 10 is a transverse sectional view along line X—X of FIG. 8.

DESCRIPTION OF THE PREFERRED EMBODIMENTS

In accordance with an initial method of implementation of the process of the invention, illustrated by FIGS. 1 to 5, a tantalum ribbon 1 of large width and little thickness (for example 0.1 mm) is cut along a line broken into crenellations so as to form two combs 2 and 2A that are identical and interleave, comprising a multiplicity of vertical transverse sections 3 or 3A, connected by a longitudinal section 4 or 4A.

Figure 1:
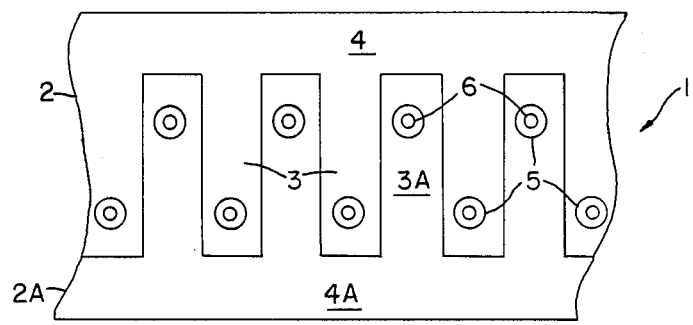
FIG. 1 is a top view of a strip of tantalum from which two support elements have been cut out for applying the process of this invention in accordance with a first embodiment.
Figure 2:
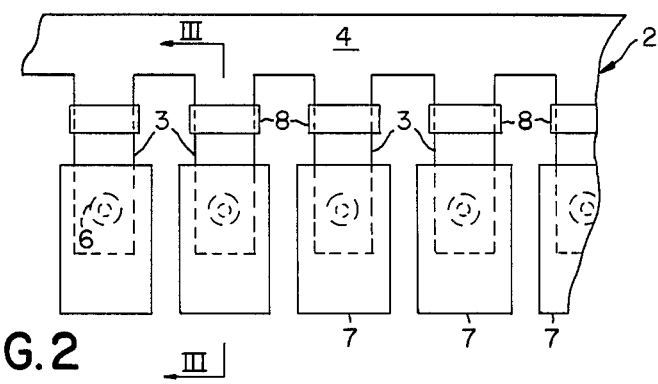
FIG. 2 is a top view of one of the support elements of FIG. 1 to which porous tantalum pellets have been added.
Figure 3:
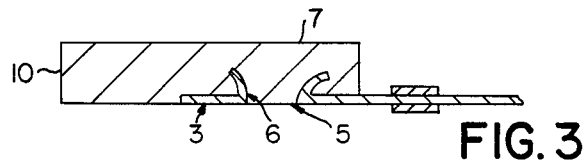
FIG. 3 is a section view along line III—III of FIG. 2.
Figure 5:
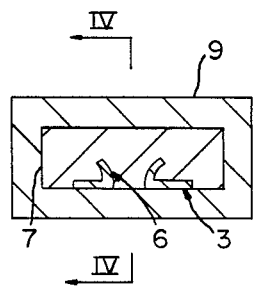
FIG. 5 is a transverse sectional view along line V—V of FIG. 4
Figure 4:
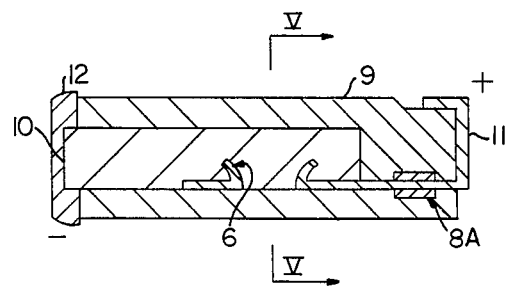
FIG. 4 is a longitudinal section view along line IV—IV of FIG. 5 of a completed capacitor comprising the anode of FIG. 3.

FIGS. 3 and 7 represent tantalum anodes jointly presenting the characteristic of comprising a porous body or core, here of generally rectangular shape, of which one side face has running along it over at least part of its surface a tantalum strip extending beyond at least one terminal face of the rectangular core. This tantalum strip comprises a zone incurvated towards the inside of the core, thus ensuring respective attachment of this core and the strip. FIGS. 3 and 7 each represent a multiplicity of such anodes connected together through these tantalum strips forming part of a support element enabling these anodes to be processed simultaneously in order to form capacitors, and in particular chip capacitors.

Each of the transverse sections (or teeth) 3 and 3A of the combs 2 and 2A is distorted in a zone 5 so as to present an incurvated part 6 towards the outside of the plane of the comb. These incurvated parts are eyelet-like pieces brought about by "piercing" the transverse sections.

Pellets 7, the purpose of which is to form the cores of anodes for capacitors, are added to each of the teeth 3 of a comb 2 by pressing powder directly onto these teeth, with the incurvated zones 6 immersed into the powder, whilst a flat section of these teeth runs along the pellets. The latter flat sections are preferably rectangular in form.

All the pellets 7 pressed onto the teeth 3 of a comb 2 are then sintered at high temperature and in a vacuum under conventional prior art conditions. The comb 2 carrying the anode cores 7 thus formed acts as support element and electrical conductor for the subsequent processing operations, which are innately conventional in the prior art.

A telfon sleeve 8 of average viscosity is applied to each transverse section of comb 2 between the porous cores 7 and the longitudinal section 4, in accordance with conventional arrangements. These porous cores 7 are then immersed into a solution of manganese nitrate and then passed through a furnace for a pyrolysis phase, during which manganese dioxide is formed. This dioxide is prevented from rising along the teeth 3 by the teflon sleeves 8.

As a variant, not represented in the drawings, the teflon sleeve 8 is replaced by appropriate sealing strips, tightened and assembled together so as to act as a handling device.

Following pyrolysis, the anodes are dipped into a carbon solution ("AQUADAG") and then a silver bath as in the conventional prior art process for solid electrolyte capacitors.

The anodes thus made can form the core of a considerable number of types of capacitors.

To execute a chip capacitor, encapsulation is achieved by molding the various porous cores 7 in a molding resin 9, in accordance with the provisions of above-identified application Ser. No. 933,404, whilst nonetheless protecting a terminal face 10 of these cores opposite the longitudinal section 4 of comb 2, by means of a flexible pad.

In practice, a section 8A of the teflon sleeve 8 is thus encapsulated.

Each of the teeth 3 of the comb 2 is then cut and as proposed in the patent application mentioned, the residual portion 11 of the transverse sectioned 3 linked to the porous cores (previously deoxidized, for example by sandblasting) is covered, together with the terminal face 10 of these cores which has been preserved from any encapsulation by layers of nickel 12 (electrochemically or electrolytically deposited) then with a solderable material (lead-tin or tin alloy) and/or gold. The residual portion or lug 11 is then folded against the block of resin 9.

As a variant, not represented, the teeth of the comb are cut level with the block of resin 9 and the positive and negative terminals are made as proposed in the patent application mentioned.

In another method of implementation according to this invention, represented by FIGS. 6 to 10, a continuous strip of tantalum 20 is used in which from time to time the zones 5' are distorted so as to form incurvated parts 6' directed towards the outside of the plane of the strip 20. As before, these consist of eyelet pieces obtained by piercing the strip.

Pellets 21 are then added by pressing powder, submerging the incurvated parts 6', then by sintering, as in the case of FIGS. 1 to 5. This provides a series of pellets 21, between which teflon sleeves 22 are applied so as to prevent any subsequent covering of the zones thus protected by the manganese dioxide during the subsequent pyrolysis operation that is carried out as previously following immersion of the series of pellets in manganese nitrate.

Here, the application of silvering 23 is limited to the side faces 24 and 25 of the pellets 21.

Any possible excess teflon is removed by any appropriate mechanical means or by thermal effect obtained by a laser sweep over the zone of strip 20 used to ensure the external connections.

The series of pellets 21 is then sent to a mold in which the pellets are encapsulated in the resin 26, except for the silver-coated faces 24 and 25, which are protected by flexible pads, by analogy to what the patent application mentioned proposes. Portions 22A of the teflon sleeves are in practice encapsulated by the resin.

The visible portions of the tantalum strip 20 are then mechanically sandblasted (or for example by projection of alumina powder) in order to bare the tantalum. Metallization operations are then carried out, depositing a layer of nickel and a terminal layer (lead-tin alloy, tin or gold). This gives two positive ribbons 27 of the capacitor that are folded against the block of resin 26.

The silver-coated lateral faces 24 and 25 are likewise covered with a layer of nickel and a terminal layer so as to form negative terminals.

The second method of implementation enables totally symmetrical polarized capacitors to be built, with optimum use of the tantalum strip, since all the material is used for the external connections.

It is manifest that the above description is proposed only a a non-limitary and indicative example and that many variants can be proposed by the man of the art whilst still remaining within the framework of the invention. For instance, in particular, the incurvated zone intended for attachment of the porous body to the strip can also be obtained by distorting the edges of the strip towards the inside of the porous body. Equally, the technique known as "expanded metal" can be used. In addition, the invention can be generalized to any geometry of porous body, whether a parallelepiped, prism, cylinder or other; the strip preferably extends along the outer surface of this body, and advantageously along a flat face, but can also penetrate to the inside of this body.

What is claimed is:

1. An anode for a capacitor comprising a porous body (7,21) connected to an elongated element (3,20) characterized in that said elongated element is a strip presenting an incurvated zone (6, 6') in the form of a rolled-over eyelet-like piece anchored in said body.

2. The anode in accordance with claim 1 characterized in that said strip runs at least partly along the outer surface of said porous body (7,21).

3. The anode in accordance with claim 1 characterized in that said strip (20) protrudes on either side of said porous body (21).

4. A process for manufacturing anodes for capacitors whereby a porous body (7,21) is pressed and sintered to an elongated connection element (3,20) characterized in that a strip is locally incurvated (6,6') to the outside of its plane by piercing so as to obtain rolled-over eyelet-like pieces in said strip, and said porous body is pressed and sintered to said strip so as to retain captive within said body the zone of said strip thus incurvated.

5. The process in accordance with claim 4 characterized in that said strip is laid along the outer surface of said porous body.

6. The process in accordance with claim 4 characterized in that said incurvated zone (6) is arranged on a section of said strip (3) laid crosswise to a longitudinal section (4) and that said sections (3,4) are cut from a common strip.

7. The process in accordance with claim 4 characterized in that said incurvated zone (6') is arranged along a continuous strip (20).

8. A capacitor comprising a porous body (7,21) encapsulated into a block of resin (9,26) and connected to an elongated element (3,20) forming a positive terminal, and a negative terminal, characterized in that said elongated element is a strip having an incurvated zone (6,6') in the form of a rolled-over eyelet-like piece anchored into said body.

9. The capacitor in accordance with claim 8 characterized in that said strip runs at least partly along an outer surface of said porous body (7,21).

10. The capacitor in accordance with claim 8 characterized in that said elongated element (20) extends to two terminal faces of said block of resin (26) and that two negative connection zones (24,25) are formed on two opposed lateral faces of said body, which are not encapsulated into the block of resin.

* * * * *